March 23, 1971                R. G. MURRAY                3,572,297
                HYDROGEN FUELED INTERNAL COMBUSTION ENGINE
Filed Jan. 26, 1970                                4 Sheets-Sheet 3

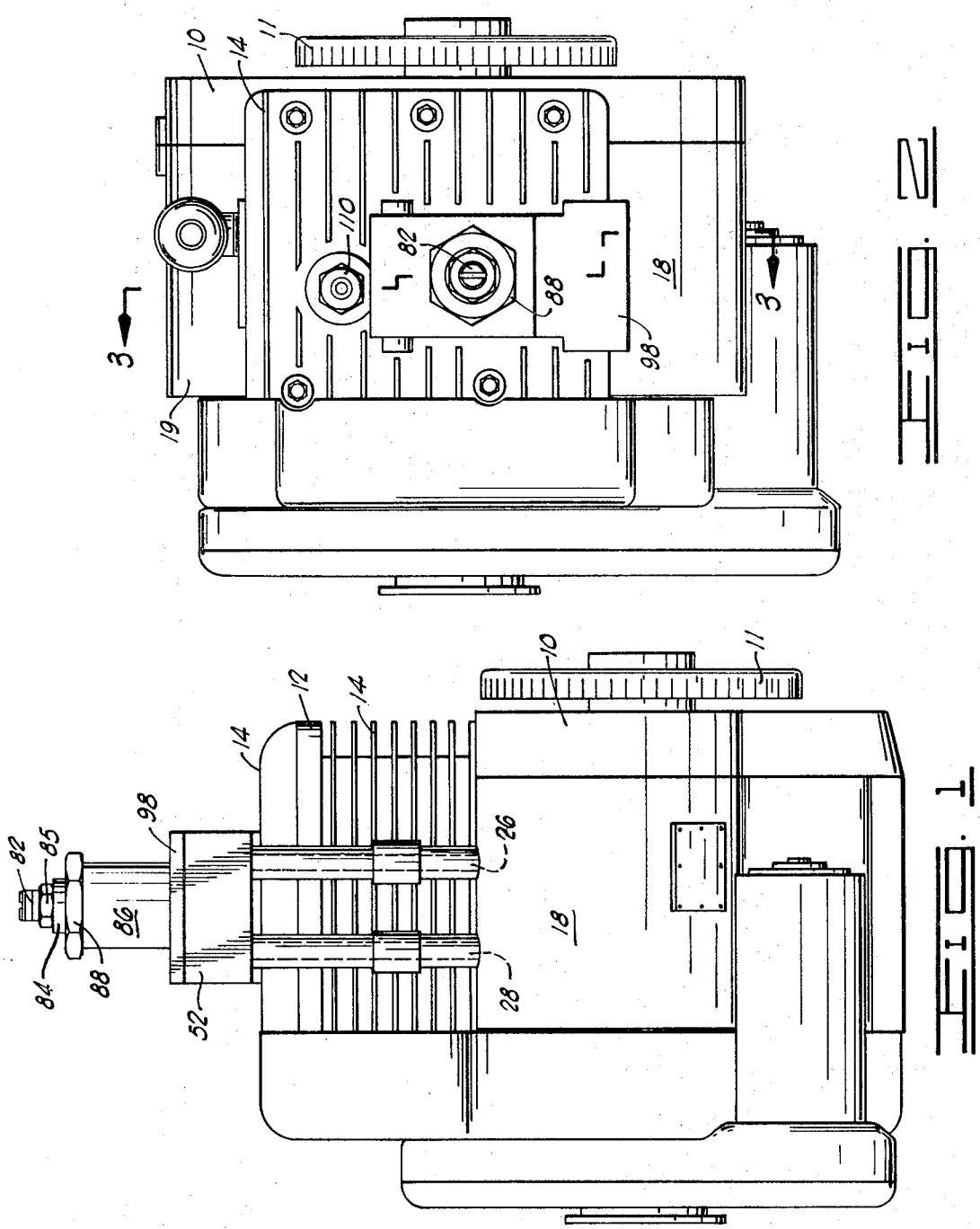

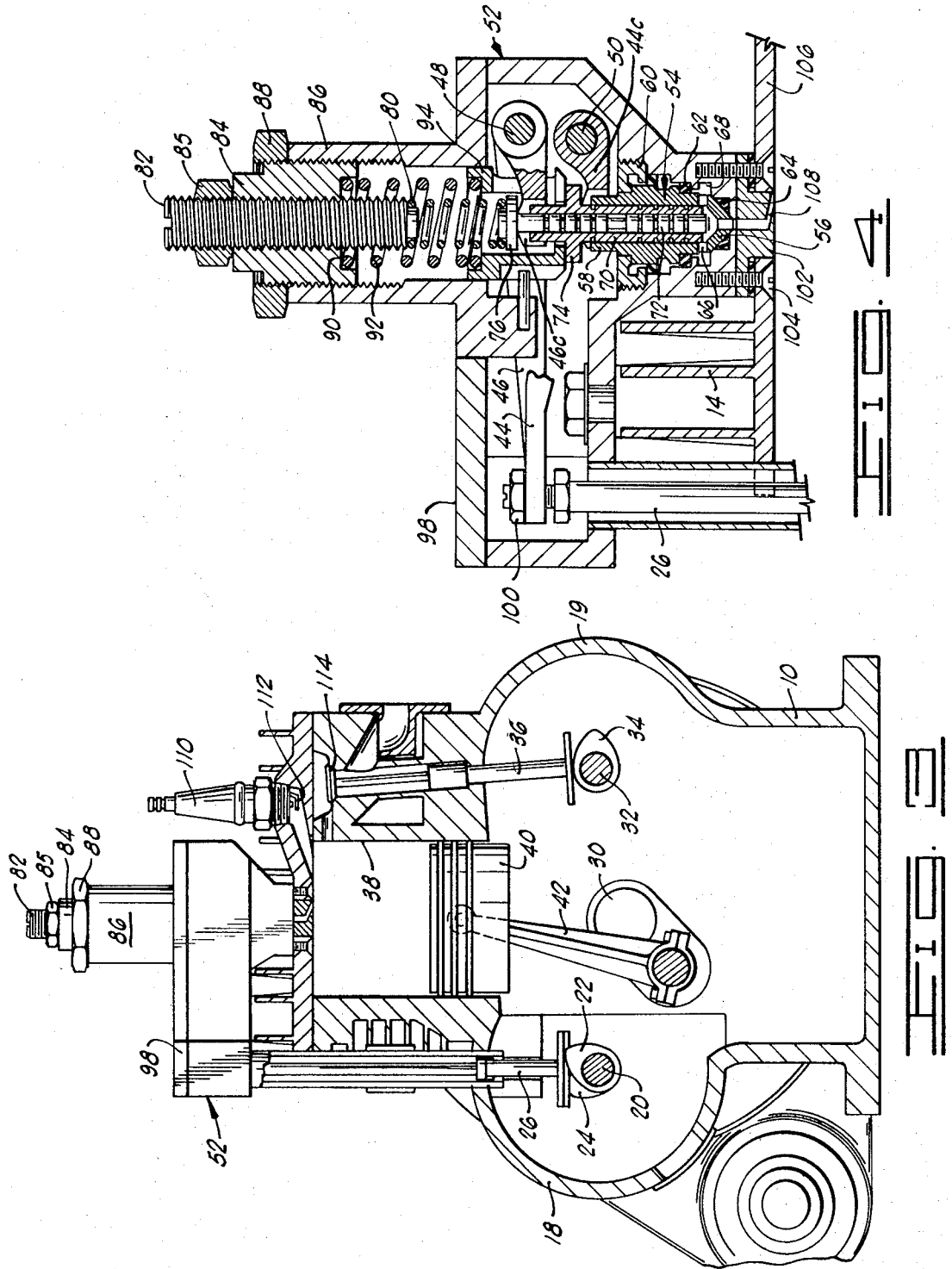

INVENTOR
RICHARD G. MURRAY

BY
Dunlap, Laney, Hessin & Dougherty
ATTORNEYS

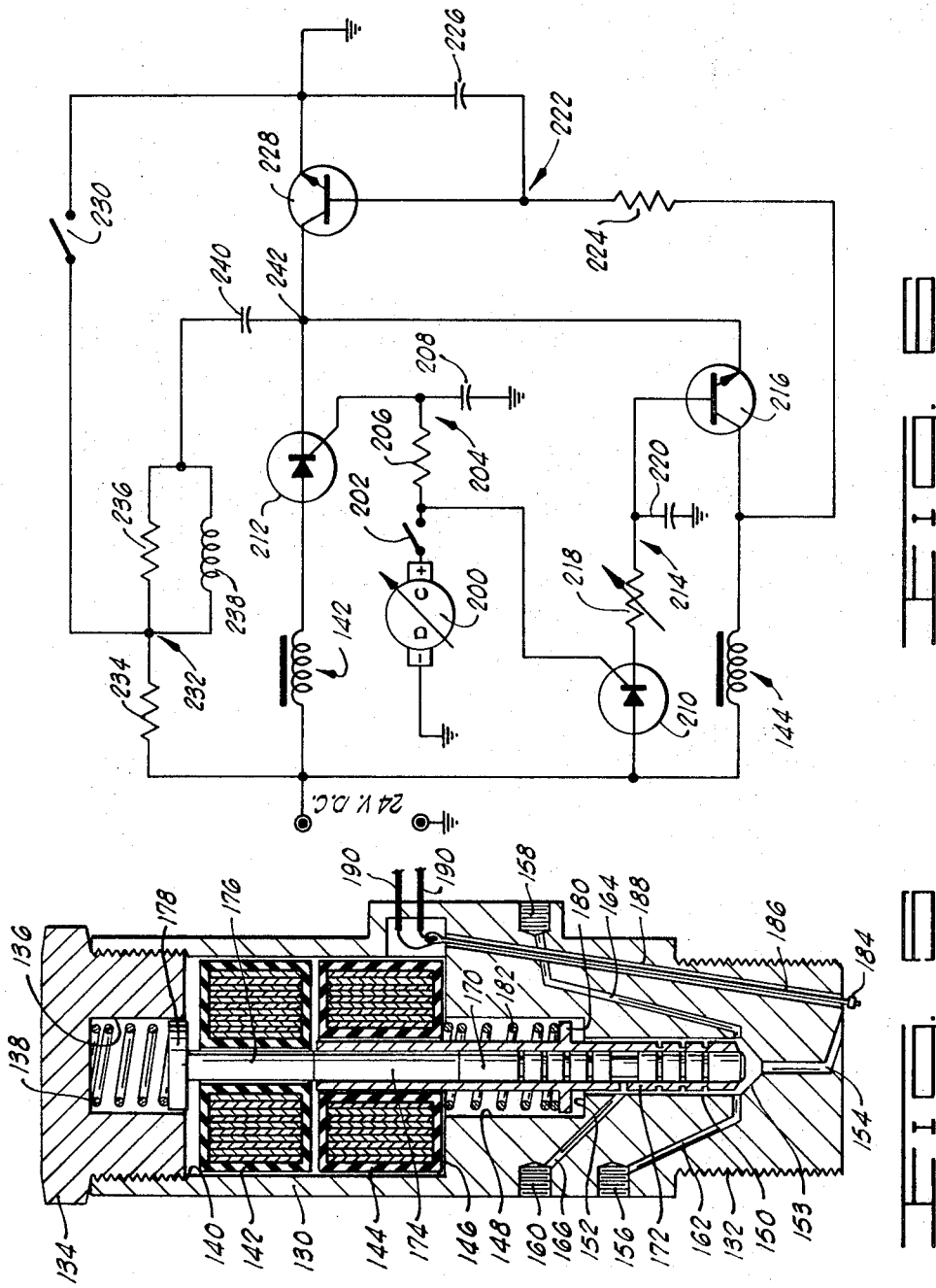

United States Patent Office 3,572,297
Patented Mar. 23, 1971

3,572,297
HYDROGEN FUELED INTERNAL
COMBUSTION ENGINE
Richard G. Murray, Perkins, Okla., assignor to Roger J.
Schoeppel and Roger C. Allen, Stillwater, Okla.
Filed Jan. 26, 1970, Ser. No. 5,791
Int. Cl. F02b 1/10, 3/04, 43/12
U.S. Cl. 123—1
21 Claims

ABSTRACT OF THE DISCLOSURE

This invention relates to an internal combustion engine operated by direct injection of hydrogen into the cylinders thereof. Hydrogen is mixed with a portion of the air in the cylinders to form a combustible mixture which is ignited and burned concurrently with injection over a portion of the expansion stroke and in some cases a portion of the compression stroke. Dual poppet valves are used for injecting the hydrogen and are timed to open and close in response to sensed engine operating parameters.

BACKGROUND OF THE INVENTION

Field of the invention

This invention relates to internal combustion engines operated by injection of a combustible gaseous fuel directly into the cylinders of the engine. In one more restricted aspect, the invention relates to injection valves useful for injecting hydrogen into the cylinders of internal combustion engines.

Brief description of the prior art

It has been heretofore proposed to fuel internal combustion engines with hydrogen gas. This fuel burns in air to yield water as the main product of combustion, and therefore fewer atmospheric contaminants result from its use under controlled conditions. By controlling the air-fuel ratio, relatively lower temperatures may be produced than when fossil fuels are employed.

The use of hydrogen as a fuel for internal combustion engines was demonstrated in the 1930's by the German engineer, Rudolph Erren. His work is epitomized in U.S. Pat. 2,183,674, U.S. Pat. 1,901,709, British Pat. 462,605, and British Pat. 364,180, and included a proposal for directly injecting hydrogen into the cylinders of the engine early during the compression stroke and terminating such injection not later than 80° before top dead center during the compression stroke (British Pat. 462,605). Erren's major operational problem and one that he was not able to overcome was detonation within the combustion chamber.

In the late 1940's, King, Wallace and Mahapatra at the University of Toronto worked with a co-operative fuel research (CFR) internal combustion research engine in studying the nuclear theory of ignition for various hydrogen-air mixtures over a range of pressure ratios. A hydrogen-air mixture was admitted to the cylinder through a carburetor. Unless frequent, regular and thorough schedules for cleaning the combustion chamber were set up, severe knocking due to detonation, and pre-ignition made it impossible to run the engine on any but the leanest mixtures and lowest compression ratios.

In 1963, the Vickers division of the Sperry Rand Corporation sought to produce a hydrogen fueled internal combustion engine for use with spacecraft. The Marquardt Corporation of Van Nuys, Calif., undertook a similar project. Both the Vickers and Marquardt projects utilized a mixture of hydrogen and oxygen with hydrogen serving as the working fluid and the engine exhausting into a vacuum. The use of substantially pure oxygen as the oxidizer was found to produce significantly increased thermal stress in the engine and led to severe corrosion, leakage and lubrication problems. In the Vickers and Marquardt engines, ignition delays and detonation occurred to an undesirable extent. Both projects were abandoned before a practical engine was developed.

BRIEF DESCRIPTION OF THE PRESENT INVENTION

The present invention provides a practical hydrogen fueled internal combustion engine which, through the unique combined concepts of direct hydrogen injection, employment of air as the oxidizer, and igniting the hydrogen during its injection and sustaining the combustion over a specific range of the engine cycle, poses no significant problem of pre-ignition, detonation or excessive thermal stress. The engine differs from the previously known systems basically in how and when hydrogen fuel is injected and ignited, and in the oxidizer used to yield the combustible mixture. In another aspect, the inventive concepts herein disclosed encompass a novel fuel injector valve, and control devices used to optimize the actuation of this valve.

Broadly described, the present invention comprises a method of hydrogen fueling an internal combustion engine which includes the steps of passing air into the cylinder of the engine; injecting substantially pure hydrogen directly into the cylinder of the engine beginning the injection at a time which is between 60° and 0° before top dead center of the compression stroke, igniting the hydrogen immediately after the commencement of injection by means of a spark plug, hot wire (glow plug), hot air (compression ignition), or catalytically; continuing to inject hydrogen directly into the cylinder of the engine until between 0° and 90° after top dead center during the expansion stroke; and substantially concurrently with the direct injection of hydrogen, sustaining combustion of the hydrogen.

In a different aspect, the invention relates to the apparatus by which the described method is carried out, including an internal combustion engine having at least one cylinder, single or multiple poppet injector valves mounted on each cylinder for injecting hydrogen gas directly into the respective cylinder, and means for automatically controlling the opening and closing of the poppet valves in response to certain engine operating parameters and means for igniting said hydrogen gas. In one construction with dual poppet valves, the valves are coaxially and concentrically disposed and are each connected to valve stems which are individually actuated in timed sequence by a pair of sequentially energized solenoids to thus open the valves, and are returned to a position of closure by suitable spring elements after de-energization of the respective solenoids.

An important object of the invention is to provide a practical internal combustion engine with which atmospheric contamination resulting from engine operation is substantially reduced as compared to internal combustion engines now in use.

An additional object of the invention is to provide a practical internal combustion engine which does not employ fossil fuels in its operation. Non-fossil fuels, as hereinafter used, is defined as fuels excluding gasoline, kerosene and fuel oils.

A further object of the invention is to provide a hydrogen fueled internal combustion engine in which detonation and preignition are minimized.

Another object of the invention is to provide a hydrogen fueled internal combustion engine which is safer to operate than hydrogen fueled internal combustion engines previously built.

3

Yet another object of the invention is to provide a hydrogen fueled internal combustion engine which does not become fouled as quickly, or require cleaning of the combustion chamber as frequently, as the engines of this type which have been previously proposed.

Another object of the invention is to provide a hydrogen fueled internal combustion engine which is characterized in having a relatively long and trouble-free operating life.

Additional objects and advantages of the invention will become apparent as the following detailed description of the invention is read in conjunction with the accompanying drawings which illustrate the invention as it relates to a single cylinder engine.

BRIEF DESCRIPTION OF THE DRAWINGS

FIG. 1 is a side elevation view of an internal combustion engine constructed in accordance with the present invention.

FIG. 2 is a plan view of the internal combustion engine depicted in FIG. 1.

FIG. 3 is a sectional view taken along line 3—3 of FIG. 2.

FIG. 4 is an enlarged, partially sectional, partially elevational view of one embodiment of a mechanically actuated dual poppet injection valve constituting a subassembly of the invention.

FIG. 5 is an enlarged, partially sectional, partially elevational view of a different embodiment of a duel poppet injection valve constituting a subassembly of the invention.

FIG. 6 is a schematic wiring diagram illustrating electrical circuitry utilized for controlling fuel injection in response to engine speed and engine loading.

DETAILED DESCRIPTION OF PREFERRED EMBODIMENTS OF THE INVENTION

Figure 7:
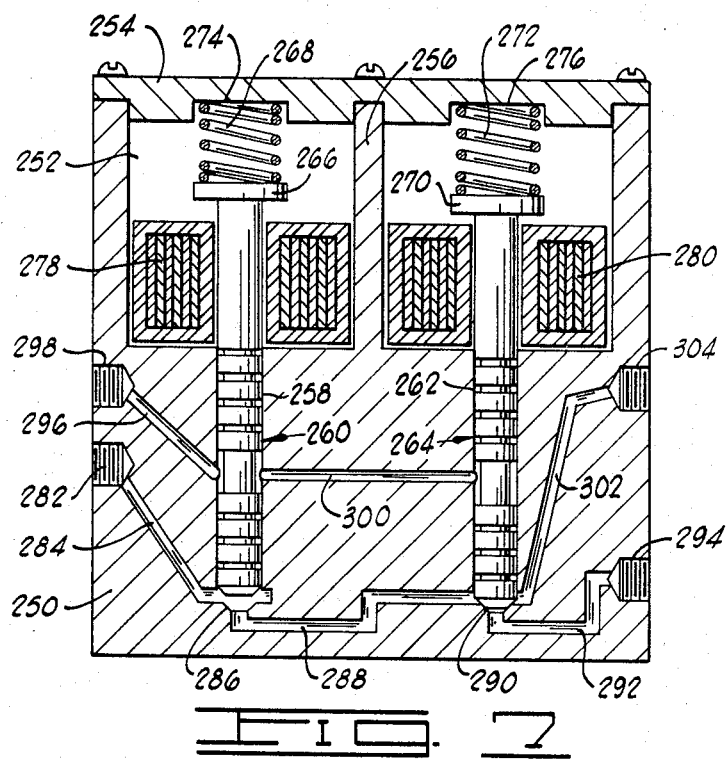
FIG. 7 is an enlarged, partially sectional, partially elevational view of yet another embodiment of an injection valve assembly useful in the invention.

Referring initially to FIGS. 1, 2, and 3, shown therein is a single cylinder, L-head internal combustion engine. The engine includes a cranckcase 10 having mounted thereon a cylinder head 12 carrying cooling fins 14. A crankshaft 30 extends through the crankcase 10, projects from opposite sides thereof, and has a vibration dampening flywheel 11 mounted on one of its ends. Protruding from opposite sides of the crankcase are a pair of cam shaft chambers 18 and 19. The cam shaft chamber 18 carries a dual lobed injector valve cam shaft 20 which has a pair of lobes 22 and 24 secured thereon for actuating a pair of push rod subassemblies 26 and 28 in a manner hereinafter described. The crankshaft 30 extending centrally through the crankcase 10 is drivingly connected to the cam shaft 20 by suitable gearing (not shown). The crankshaft 30 also drives through suitable gearing (not shown) a cam shaft 32 carrying cam lobes 34. The cam lobes 34 operate push rods 36 for opening and closing the intake and exhaust valves for admitting air and exhausting combustion products from the cylinder of the engine. The cylinder of the engine appears in FIG. 3 and is designated by reference numeral 38. The cylinder has slidingly and reciprocably mounted therein a piston 40 which is driven from the crankshaft 30 by a crank arm 42 in a conventional manner.

Figure 4A:
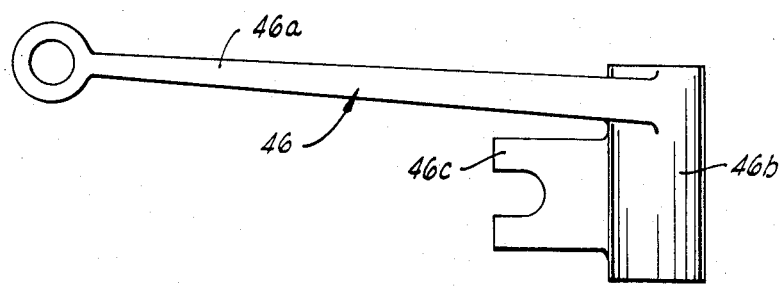
FIG. 4A is a detail plan view illustrating a rocker arm forming a portion of the mechanical linkage of the hydrogen fueled engine.

The engine as thus broadly described is a commercially available four horsepower, four-cycle, one-cylinder, L-head engine which has been modified in its construction to accommodate the injection of gaseous hydrogen directly into the cylinder in accordance with the present invention. The structure which is utilized to accomplish such injection includes the push rod subassemblies 26 and 28 to which reference has hereinbefore been made. The push rod subassemblies 26 and 28 extend upwardly from the cam shaft 20 and are connected through a suitable ball joint connection, or other movement-facilitating connection, to rocker arms 44 and 46 (FIG. 4) disposed at the upper ends of the push rod subassemblies 26 and 28, respectively.

The rocker arms are similar in construction, and include elongated shaft portions 44a and 46a (FIG. 4A), respectively. Each of the rocker arms 44 and 46 has a sleeve portion 44b and 46b, respectively, at the end thereof opposite its end which is connected to the respective push rod subassembly 26 or 28, and the sleeves of the rocker arms are journaled on a pair of shafts 48 and 50 which extend between the walls of an injector housing designated generally by reference numeral 52. Extending in a reverse direction from the sleeve 44b and 46b and parallel to the shaft portions 44a and 46a, respectively, are bifurcated lifting plates 44c and 46c, respectively.

The rocker arms 44 and 46 function, in response to the rotation of the cam shaft 20, to sequentially operate the dual valves of a dual poppet valve subassembly designated generally by reference numeral 54. The dual poppet valve subassembly 54 includes a conically tapered valve seat 56 having a port through the apex or lower end thereof, with the seat being formed on the lower end of a sleeve 58 which has a central bore therethrough communicating with the hollow interior of the conically tapered seat, and aligned with the port through the seat. The sleeve 58 carries a shoulder which facilitates its location and retention in the injector housing 52 by means of a nut 60 which is threaded into a threaded portion of the injector housing, and bears against the shoulder on the sleeve 58 to retain the shoulder in position. Suitable elastomeric sealing elements 62 are provided between the injector housing 52 in the sleeve 58 to provide a seal around the sleeve, and an elastomer seal 64 is also provided between the conically tapered valve seat 56 and the injector housing 52 to provide a seal at this location. The sleeve 58 carries ports 66 which facilitate the entry into the interior of the sleeve of a gaseous fuel from a circumferential fuel injection passageway 68 which surrounds the sleeve in alignment with these ports.

Disposed within the bore through the sleeve 58 are a pair of concentric valve elements, these being referred to as an outer valve element 70 and an inner valve element 72. It will be perceived that the outer valve element is in the form of a sleeve surrounding the inner valve element 72, and that the outer valve element carries a flange 74 at the upper portion thereof which is engaged by the bifurcated lifting plate 44c of the lower rocker arm 44. The inner valve element 72 is an elongated shaft having a flange 76 at the upper end thereof which flange rests upon the lifting plate 46c of the upper rocker arm 46. The flange 76 also functions as an abutment or stop for the lower end of a return spring 80. The return spring 80 engages the lower end of an externally threaded spring retainer element 82 which is threaded into a spring retainer sleeve 84 having an axial, internally threaded bore therethrough for receiving the spring retainer 82. A nut 85 is utilized for retaining the spring retainer 82 at the desired location within the retainer 84.

The spring retainer sleeve 84 is threaded into a threaded bore formed in a spring cover 86, and is retained in this position by a suitable nut 88. It will be noted that the spring retainer sleeve 84 has a counterbore 90 formed in the lower end thereof and that this counterbore receives the upper end of a valve return spring 92 which extends downwardly therefrom and is coaxially located with respect to the valve return spring 80. The lower end of the valve return spring 92 projects into a counterbore formed in the upper end of a bridge element 94 which is slidingly inserted in the bore through the spring cover 86, and which is bored to receive the upper end of the inner valve element 72. One side of the generally cylindrically shaped bridge element 94 is cut away or apertured to permit the lifting plate 46c of the rocker arm 46 to project into the interior of the bridge element, and engage the flange 76 on the upper end of the inner valve element 72. At its lower end, the bridge element 94 carries an inwardly projecting flange which bears against the upper side of the flange 74 carried by the outer valve element 70. It will thus be noted that the bridge element 94 functions to transfer the bias of the valve return spring 92 to the outer valve element 70 so that, at such time as the lower rocker arm 44 is not functioning to lift and open the outer valve element 70, the valve return spring 92, acting through the bridge element 94, will force this valve element to be reseated. In the status of the valve illustrated in FIG. 4, both the inner valve element 72 and the outer valve element 70 are in the open positions as a result of being lifted by the rocker arms 44 and 46.

In concluding the description of the subassembly depicted in FIG. 4, it may be pointed out that a cover plate 98 is provided for covering a cut away portion of the injector housing 52 so that access may be had to locknuts 100 used for securing the push rod subassemblies 26 and 28 to the rocker arms 44 and 46, and to facilitate adjustment of the throws of the rocker arms in response to the rotation of the cam shaft 20. Also, bolted to the lower side of the injector housing 52 is an orifice plate 102 which is also bored to receive bolts 104 extended through the cylinder head 106 of the engine. It will be noted that the orifice plate 102 is provided with an orifice 108 which is aligned with an opening formed in the lower end of the injector housing 52, which opening is aligned with the port through the conically tapered valve seat 56. Thus, by the passageway thus formed, gaseous fuel may be injected through the orifice 108 in the orifice plate 102 into the cylinder in a manner hereinafter described in greater detail.

The engine illustrated is conventionally constructed to further include a spark plug 110 which has its contact elements 112 communicated with the combustion chamber at the upper end of the cylinder 38. There are also provided the conventional intake and exhaust valves for admitting air to the combustion chamber and exhausting combustion products therefrom. The air intake valve appears in FIG. 3 and is designated by reference numeral 114. As previously explained, this valve is opened and closed in response to the rotation of the cam shaft 32 acting through a suitable push rod subassembly 36. The exhaust valve is operated in similar manner.

OPERATION

In the operation of the engine depicted in FIGS. 1–4, atmospheric air is drawn into the cylinder 38 on the intake (induction) stroke in conventional fashion, with the valve 114 being opened in properly timed sequence by the action of the cam shaft 32. During or at the end of the compression stroke, the injection of compressed gaseous hydrogen fuel is commenced. As the cam shaft 20 is rotated, the lobe 22 biases the push rod subassembly 26 upwardly, resulting in the pivotation of the rocker arm 44 to open the outer valve member 70. Opening of the outer valve member 70 is timed to commence at some time relatively early in the compression stroke. As the outer valve member 70 commences to open, hydrogen gas under pressure passes this valve member and contacts the inner valve member 72 which is still closed at this time. As the cam shaft 20 continues to rotate the cam 24 lifts the push rod subassembly 28, to pivot the rocker arm 46 and open the inner valve member 72. The opening of the inner valve member 72 is timed to occur not earlier than 60° before top dead center of the compression stroke (120° after stroke turnaround at bottom dead center). Preferably, opening of the inner valve member 72 is commenced about 30° or less before top dead center.

With the opening of the inner valve member 72, pressurized hydrogen gas commences to flow into the cylinder 38. The ignition circuitry is arranged to energize the spark plug 110 at the time that hydrogen injection is commenced. Almost instantaneously, the combustible mixture of hydrogen and air which is adjacent the opening of the orifice 108 through the orifice plate 102 will be ignited, and a jet of flame extending from the orifice outwardly into the cylinder will be developed. As the inner valve member 72 opens wider, a greater amount of hydrogen will flow into the cylinder, and the flame front in the combustion chamber of the cylinder will be enlarged, but the combustion will be continuous and uninterrupted. The time during the compression stroke at which the inner valve member 72 is opened is dependent upon its rates of opening and the speed with which ignition is initiated after the first instant of opening. It will be apparent to those skilled in the art that it is essential that no large magnitude force is developed by combustion in opposition to the continued upward movement of the piston 40 in completing the compression stroke. Thus, in optimum operation, ignition is effected just prior to, or at the time of the attainment of the top dead center position by the piston 40. The commencement of opening of the inner valve member 72 at the described time of 60° before top dead center (or more preferably, 30° or less) is based upon this consideration, and the lag time occurring between initial opening of this valve member, and the commencement of actual combustion of the fuel air mixture.

For any specific open time of the injector and any specific orifice diameter, the actual quantity of fuel injected into the cylinder is controlled by the injector inlet pressure, which is in turn controlled by an undisclosed pressure regulating device responsive to engine speed and loading conditions.

An important function of the dual poppet valve system is to permit the necessary high speed, rapid sequence opening and closing of access to the cylinder 38 to be efficiently achieved without malfunction and loss of proper timing due to mechanical or electrical time lags, and the necessity to adequately overcome and dissipate inertial forces. Thus, for example, before the inner valve member 72 can be fully opened, and then returned to a closed position by the return spring 80, the time at which hydrogen flow to the cylinder 38 should be terminated has passed. This problem is obviated by starting to close the outer valve element 70 before the inner valve member 72 has quite completed its opening movement—this, of course, being accomplished by proper dimensioning and relative orientation of the lobes 22 and 24 on the cam shaft 20. In order to accomplish this earlier closing movement of the outer valve element, it is necessary to open it earlier than the inner valve member 70, and therefore the need is present for the opening sequence hereinbefore described.

As to the time when the flow of hydrogen to the cylinder is terminated, this is made to occur by closure of the outer valve member 70 at a time not later than 90° after top dead center during the expansion stroke of the piston 40. Preferably, closure of this valve occurs before 60° after top dead center. Combustion of the hydrogen in the cylinder continues up until this time, and occasionally for a very short time interval following the cessation of injection. After closure of the outer valve member 70, the inner valve member 72 can be closed at any time, provided its closure is effected before commencing to open the outer valve member shortly after commencement of the next compression stroke. Closure of both valve members is, of course, effected by the respective valve return springs 80 and 92.

It is an important feature of the present invention that hydrogen injection is commenced late in the compression stroke and is continued into the expansion stroke, the optimum timing depending on flow conditions and engine parameters. Ignition is initiated as soon as possible after the commencement of injection, and combustion is maintained throughout the period of injection. By operating the engine in this manner and utilizing air as the combustion supporting material, pre-ignition and detonation are reduced, the combustion temperature is maintained at a reasonable level, and smooth and knock-free operation of the engine is obtained. Although the utilization of a dual poppet valve for fuel injection is not essential to successful operation of the engine, the two-valve design allows more response time for the several components of the valve system, thereby reducing stress on the parts of the valve, and extending the effective operating life of the engine.

DOUBLE POPPET VALVE SUBASSEMBLY

A preferred embodiment of the double poppet injector valve useful for the injection of hydrogen into each combustion chamber of an internal combustion engine in accordance with the present invention is depicted in FIG. 5. This double poppet valve includes a housing 130 which has, in the form shown, a threaded lower end portion 132 permitting the housing to be threaded into the cylinder head of an engine. Other suitable types of connector elements might be provided in lieu of the threaded connection. At its upper end, the housing 130 is internally threaded to receive a retainer cap 134. The retainer cap 134 has a bore 136 formed therein to receive a valve return spring 138.

The housing 130 has a large internal bore 140 in which are located a pair of electrically actuated solenoids 142 and 144. The solenoid 142 will be referred to as the inner valve solenoid, and the solenoid 144 will be referred to as the outer valve solenoid. The outer valve solenoid 144 rests on a shoulder 146 formed at the intersection between the bore 140 and a counterbore 148 in the housing 130. The counterbore 148 also communicates with a second counterbore 150 and a shoulder 152 is formed at the intersection of the two counterbores. At the lower end of the counterbore 150, a conically tapered valve seat 153 is formed, and the counterbore 150 communicates through the valve seat 153 with an injection orifice 154 formed through the lower end portion of the housing 130.

Formed in the side of the housing 130 is a high pressure hydrogen injection port 156, a purge port 158 and a leak port 160. The high pressure hydrogen inlet port 156 and the purge port 158 communicate with the lower end of the counterbore 150 adjacent the upper edge of the valve seat 153 through passageways 162 and 164, respectively, which are formed in the housing 130. At a medial location along the length of the counterbore 150, a passageway 166 communicates with this counterbore and places it in communication with the leak port 160.

Extending coaxially in the counterbores 148 and 150, and through the bore 140 are an inner valve 170, and an outer valve 172 which coaxially and slidably surrounds the inner valve. The inner valve 170 is connected through a spacer 174 to an inner valve spring follower 176. The inner valve spring follower 176 has a flange 178 located at the upper end thereof and bearing against the lower end of the valve return spring 138. The outer valve 172 has a flange 180 formed intermediate its length and positioned between the lower end of a valve return spring 182 and the shoulder 152 formed at the intersection of the counterbore 148 with the counterbore 150. The upper end of the valve return spring 182 bears against the lower end of the outer valve solenoid 144.

For the purpose of igniting the combustible gaseous mixture in the combustion chamber during operation of the engine, a glow plug 184 is provided adjacent the lower end of the housing 130, and is connected to a suitable electrode 186 which is surrounded by suitable insulation, and is extended through a small bore 188 formed in the housing 130. At the upper end of the bore 188, the electrode 186 is connected to suitable electrical leads 190 for providing the electrical current necessary to the energization of the glow plug 184.

In placing into operation of the dual poppet valve depicted in FIG. 5, the fuel injection system is first purged by connecting an inert gas, such as nitrogen, to the high pressure hydrogen inlet port 156. The purged gas is vented through the purge port 158. After purging, the purge port 158 is closed by a suitable plug. A source of high pressure hydrogen gas is then connected to the high pressure hydrogen inlet port 156, the ignition device 184 is connected to a suitable ignition circuit and the inner and outer valve solenoids 142 and 144, respectively, are electrically connected to a timing circuit which will operate the solenoids in a manner to be described, and in timed sequence in synchronism with the stroke of the piston within the cylinder of the internal combustion engine.

At a time early in or before the beginning of the compression stroke of the combustion engine, the outer valve solenoid 144 will receive an electrical impulse from the control circuitry which is responsive to the engine speed, and the pulse is timed according to the stroke cycle of the engine. The development of a magnetic field in the outer valve solenoid 144 will cause the outer valve element 172 to open, thereby permitting the high pressure hydrogen to come under the influence of the inner valve element 170 which is, at this time, still closed. It should be pointed out that in operation, the opening of the inner valve element 170 will commence to occur at a time after the complete opening of the outer valve element, and that one of the main advantages of the dual poppet valve system utilized in the invention is to permit better control of hydrogen flow in properly timed sequence by the use of the dual valves which more precisely control the admission of hydrogen to the orifice 154, and the termination of flow of the gas therethrough. Near the end of the compression stroke, the inner valve solenoid 142 will receive an electrical impulse, and by the developement of the magnetic field will cause the inner valve element 170 to open. The opening of both valves will then allow hydrogen to flow through the opened valves into the combustion chamber.

It will be noted that the orifice 154 injects the hydrogen into the cylinder at a point adjacent the ignition device 184. The result of injection at this point is to cause a jet of flame to be developed at the opening of the orifice into the cylinder at such time as a combustible mixture of hydrogen and air is there developed. This ignition is, as previously explained, timed to occur close to, or at the instant of, the upper dead center position during the compression stroke of the piston. The combustion then continuously occurs until hydrogen flow into the cylinder is cut off. Early in the expansion stroke of the piston, the current to the outer valve solenoid 144 is terminated by the control circuitry, and the other valve element 172 is closed by action of its valve return spring 182. Closure of the outer valve element 172 interrupts the flow of hydrogen to the combustion chamber, and complete flow of hydrogen is terminated somewhere at or near about 90° after top dead center of the piston stroke, or preferably before this position, depending on the power required of the engine. The current to the inner valve solenoid 142 can be terminated any time thereafter to permit the inner valve element 170 to be closed by its return spring 138. The only condition is that the inner valve element 170 be closed prior to the commencement of opening of the outer valve element on the next operating cycle.

As has been previously pointed out, the dual poppet valve design allows more time for each component of the valve assembly to respond to the electrical pulses, and the valves conjunctively effect commencement and termination of hydrogen injection in synchronism with the cyclic movement of the piston. Moreover, the use of the dual poppet valve design reduces stresses on the valve parts, and allows the time which is required for dissipation of inertial forces while still achieving opening and closing of hydrogen input to the orifice 154 at the required times.

An electrical circuit which can be used for automatically controlling the energization of the inner and outer valve solenoids 142 and 144, respectively, is depicted in FIG. 6. The control effected by the circuit here shown is correlated to the engine speed and manifold vacuum, but it will be apparent that other parameters could be sensed by appropriate sensing elements, and the opening and closing of the dual poppet valve could be made to respond to variations in the magnitude of the sensed parameters. Circuits which have been previously proposed for sensing such parameters as manifold pressure, engine temperature, injection air temperature, engine r.p.m., and the like are depicted and described in U.S. Pats. 3,456,628, 3,240,191, and 2,918,911, and the teachings of these patents are incorporated herein by reference insofar as they provide guidelines toward the construction of suitable circuitry to control the dual poppet valves used for hydrogen injection in the present invention in response to various engine operating parameters.

In the circuit depicted in FIG. 6, a signal developed by an engine driven DC generator 200 is connected through a cam shaft switch 202 to the resistance-capacitance (R–C) time delay circuit 204 containing resistor 206 and capacitor 208. The output of the DC generator is also connected through the cam shaft switch 202 directly to a silicon controlled rectifier (SCR) 210. The time delay circuit 204 is connected to a silicon controlled rectifier 212 so that, after a time delay which depends upon the applied voltage (which in turn depends upon engine speed) and the values of the resistor 206 and the capacitor 208, the silicon controlled rectifier 212 is turned on, permitting current to flow through the coil of the inner valve solenoid 142. At this time, the outer valve solenoid 144 has already been energized and the outer valve element 172 is open. Energization of the inner valve solenoid 142 thus opens the inner valve element 170, and permits fuel flow into the cylinder to commence. At the instant that the cam shaft switch 202 is closed, the silicon controlled rectifier 210 is energized and a signal is supplied to an R–C time delay circuit 214 which in turn, after a time delay which depends on the applied voltage and the resistance of resistor 218 and the capacitance of capacitor 220, turns off a lower gate turn-off triode 216. The time delay circuit 214 includes a variable resistor 218 and the capacitor 220. The value of the resistor 218 is determined by engine manifold pressure (which in turn depends on engine power output) by suitable transducer mechanism (not shown) such that, for example, a reduction in manifold pressure will in turn cause an increase in the resistance of resistor 218 which will in turn cause the time delay to be longer. A rising voltage ahead of the gate turn-off triode 216 acts upon a time delay circuit 222 which includes a resistor 224 and capacitor 226 to cause this circuit to turn off a gate turn-off triode 228 which resets the entire circuit for the next cycle of the engine. Injection time and fuel quantity are adjusted to engine needs by manipulation of applied voltage, resistance and capacitance. In order to reset the gate turn-off triode 228, an engine driven reset switch 230 is closed which in turn grounds the reset circuit 232 which contains resistors 234 and 236, an inductor 238, and a capacitor 240. When the reset circuit is grounded, capacitor 240 discharges through resistor 236 and inductor 238 which in turn instantaneously grounds the anode 242 of the gate turn-off triode 228, allowing it to reset to the ON condition. When the reset switch 230 opens, the reset circuit is recharged through resistor 234 so as to be ready for its next cycle.

It will be perceived that the control circuitry provides for the synchronization of the operation of the solenoid controlled dual poppet valve with the speed at which the engine is operated. Moreover, adjustment can be made in the timing of the fuel injection and the quantity of the fuel which is injected during the injection time period by simple adjustments in the circuit.

In FIG. 7 of the drawings, a further modified form of injector valve useful in conjunction with the internal combustion engine of the invention is depicted. As here shown, the valve assembly includes a body 250 which is bored to provide a large chamber 252 in the upper portion thereof. The chamber 252 is closed by a suitable closure plate 254 which cooperates with a transverse partition 256 located in the chamber. Extending downwardly in the body 250 from one side of the chamber 252 is a relatively small counterbore 258 which accommodates the stem portion of a first valve member designated generally by reference numeral 260. A second relatively small counterbore 262 extends downwardly from the opposite side of the chamber 252 from the counterbore 258 and accommodates the stem of a second valve member designated generally by reference numeral 264.

At its upper end, the stem of the first valve member 260 carries a spring reaction plate 266 which bears against the lower end of a helically coiled valve return spring 268. In like manner, the upper end of the stem of the second valve member 264 carries a spring reaction plate 270 which bears against the lower end of a helically coiled valve return spring 272. The upper ends of the valve return springs 268 and 272 are seated in recesses 274 and 276, respectively, formed in the cover plate 254. Surrounding the upper portion of the stem of the first valve member 260 at a location immediately below the spring reaction plate 266 is an electrical solenoid 278. A second electrical solenoid 280 surrounds the upper portion of the valve stem of the second valve member 264.

A gaseous fuel inlet port 282 is formed in the side of the body 250 and communicates with a gas passageway 284 which intersects the lower end of the counterbore 258. At this location, a suitable valve seat 286 is formed which mates with the lower end of the valve member 260 to effect closure of the passageway 284 when the valve member is seated. A gas passageway 288 extends from below the seat 286 to a point of intersection with the counterbore 262, and at this location, a valve seat 290 is formed to mate with, and accommodate, the lower end of the second valve member 264. From a point below the valve seat 290, a gas passageway 292 extends to an internally threaded outlet port 294 which can be connected in any suitable way to an injection orifice through which gaseous fuel can be injected directly into the cylinder of the engine.

For the purpose of venting any gas which may leak past the seals around the valve members 260 and 264, a gas leakage passageway 296 is formed through the body 250 and can be vented through a suitable conduit threadedly connected to a leak port 298. Communication is established with the passageway 296 from the counterbore 262 by means of a passageway 300 formed through the body 250. For the purpose of purging this system in the manner hereinbefore described prior to commencement of operation with a combustible gaseous fuel, a purge gas passageway 302 is formed through the body 250 and communicates with a threaded purge port 304 formed in the side of the body.

The poppet valve assembly depicted in FIG. 7 is operated in a fashion substantially equivalent to that which has been described as characteristic of the other poppet valve embodiments illustrated herein. The dual poppet valve of FIG. 7, however, does not locate the paired valve members concentrically or coaxially. The solenoids 278 and 280 are, however, operated in the sequence previously described, so that the fast reaction of the valve which is necessary to achieve the desired injection sequence can be realized.

Although certain preferred embodiments of the invention have been herein described in order to illustrate the basic principles of the invention adequately for its practice, it is to be understood that various changes and innovations can be effected in the operating parameters described as typical of the process of the invention, as well as in the structures depicted and described as useful for carrying out this process. For example, other combustible fuels, such as gasoline, may be mixed with the hydrogen-air mixture in the engine cylinder to modify the effects of combustion to attain a specific engine performance or to reduce atmospheric contamination. Changes of this type which continue to rely upon the basic principles of the invention are deemed to be circumscribed by the spirit and scope of the invention except as the same may be necessarily limited by the appended claims or reasonable equivalents thereof.

What is claimed is:

1. A method of fueling an internal combustion engine which comprises:

passing an oxidant into each cylinder of the engine;
 injecting a gaseous combustible non-fossil fuel directly into each cylinder of the engine during the compression stroke commencing not earlier than 60° before top dead center;
 forming a flame jet of ignited gaseous fuel extending into the cylinder from the point at which the fuel is injected into the cylinder;
 continuously injecting gaseous fuel directly into each cylinder and concurrently effecting continuous combustion of the fuel-oxidant mixture in each cylinder until a time between top dead center and 90° from top dead center in the expansion stroke, at which time injection is terminated; and
 exhausting the products of combustion from each cylinder.

2. A method of fueling an internal combustion engine which comprises:

passing an oxidant into each cylinder of the engine;
 injecting hydrogen gas into each cylinder of the engine during the compression stroke commencing not earlier than 60° before top dead center and continuously injecting hydrogen gas into each cylinder and concurrently effecting continuous combustion of the hydrogen gas-oxidant mixture in each cylinder until a time between top dead center and 90° from top dead center in the expansion stroke, at which time injection is terminated; and
 exhausting the products of combustion from each cylinder.

3. The method defined in claim 2 and further characterized to include the step of igniting the hydrogen gas-oxidant mixture in each cylinder immediately following the commencement of hydrogen injection into each cylinder.

4. The method defined in claim 2 wherein said oxidant is air.

5. The method defined in claim 2 wherein injection of hydrogen gas is commenced not earlier than about 30° before top dead center.

6. The method defined in claim 2 wherein another combustible material is mixed with hydrogen gas and air in each cylinder.

7. The method defined in claim 2 wherein the rate and amount of hydrogen gas injection into each cylinder is correlated to engine speed and engine power.

8. The method defined in claim 3 wherein the injected hydrogen gas is initially ignited as it enters the cylinder to form a flame jet extending into the cylinder from the point of injection.

9. An internal combustion engine comprising:

a cylinder;
 a piston reciprocably mounted in said cylinder;
 means for injecting a pressurized combustible gaseous non-fossil fuel directly into said cylinder at selected times during the stroke of the piston in said engine;
 timing means connected between said piston and said injecting means for operating the injecting means in response to piston movement to commence injection of said gaseous fuel directly into the cylinder during the approach of the piston toward the end of the compression stroke, and continuing said injection until the piston has undergone a portion of the expansion stroke; and
 ignition means positioned in the cylinder adjacent the point of injection of said gaseous fuel thereinto for effecting continuous combustion of said gaseous fuel in said cylinder during said injection period.

10. An internal combustion engine as defined in claim 9 wherein said injecting means comprises a double poppet valve including a pair of valve members; and
 a valve seat upon which said pair of valve members concurrently seat.

11. An internal combustion engine as defined in claim 9 wherein said injecting means comprises a solenoid operated valve; and
 orifice means closable by said valve and positioned adjacent said ignition means.

12. An internal combustion engine as defined in claim 9 wherein said ignition means comprises a glow plug positioned in said cylinder.

13. An internal combustion engine as defined in claim 9 wherein said injecting means comprises a double poppet valve including:

a body having a bore therein;
 a pair of spaced counterbores extending from said bore;
 a first valve member in one of said counterbores;
 a second valve member in the other of said counterbores and spaced from said first valve member;
 a first electrical solenoid in said bore and positioned for retracting said first valve member in its respective counterbore toward said bore upon energization;
 a second electrical solenoid in said bore and spaced from said first electrical solenoid, said second solenoid being positioned for retracting said second valve member in its respective counterbore toward said bore upon energization;
 first means in said bore for seating said first valve member when said first solenoid is de-energized;
 second means in said bore for seating said second valve member when said second solenoid is de-energized; and
 gaseous fuel passageway means through said body and closable at two different locations by seating of said first and second valve members.

14. An internal combustion engine as defined in claim 9 wherein said ignition means comprises a spark plug positioned in said cylinder.

15. An internal combustion engine as defined in claim 9 wherein said injecting means comprises:

a pair of poppet valves; and
 wherein said timing means comprises:
 an electrical control circuit comprising:
 at least two switching subcircuits; and
 at least two timing subcircuits, said timing subcircuits including means for controlling the switching function of said switching subcircuits to commence and terminate fuel flow through said valves to a cylinder of the engine in response to engine speed and power level.

16. An internal combustion engine as defined in claim 9 wherein said injection means comprises a double poppet valve assembly including:

a housing having a bore therein and having an orifice therethrough communicating with said bore;
 a valve seat adjacent said orifice in said housing;
 a first electrical coil in said bore;
 a second electrical coil in said bore;
 a first valve member reciprocably disposed in said bore for seating on said valve seat and having a portion extending into said first coil for response to the passage of electrical current through said first coil;
 a second valve member reciprocably disposed in said bore for seating on said valve seat and having a portion extending into said second coil for response to the passage of electrical current through said second coil;

spring means acting individually on said first and second valve members to bias said valve members against said valve seat; and fuel inlet passageway means in said housing for admitting gaseous fuel under pressure to said orifice when said first and second valve members are concurrently opened off said valve seat in response to passage of electrical current through said first and second electrical coils.

17. An internal combustion engine as defined in claim 16 and further characterized as including:

ignition means secured to said housing adjacent the opening of said orifice into said housing; and means for supplying electrical energy to said ignition means extending through said housing from said ignition means to a point on said housing spaced from said ignition means.

18. An internal combustion engine as defined in claim 16 wherein said housing is elongated and said orifice opens into said housing at one end thereof;

and wherein said valve further includes means adjacent said one end of said housing for securing said housing to the cylinder of an internal combustion engine with said orifice communicating with the interior of the cylinder.

19. An internal combustion engine as defined in claim 18 wherein said bore extends axially in said elongated housing, and said housing further includes a first counterbore communicating with said bore and concentrically surrounding portions of said first and second valve members; and a second counterbore of lesser diameter than said first counterbore communicating with said orifice and said first counterbore and positioned therebetween and concentrically surrounding portions of said first and second valve members.

20. An internal combustion engine as defined in claim 19 and further characterized to include a retainer cap threaded into said bore;

and wherein said spring means comprises:

a first spring between said retainer cap and said first valve member; and a second spring in said first counterbore and contacting said second valve member.

21. An internal combustion engine as defined in claim 20 wherein said second valve member includes a sleeve concentrically surrounding a portion of said first valve member; and a flange projecting radially outwardly from said sleeve and bearing against one end of said second spring.

References Cited

UNITED STATES PATENTS

| | | | |
|---|---|---|---|
| 1,275,481 | 8/1918 | Seymour, Jr. | 123—120 |
| 1,520,772 | 12/1924 | Ricardo | 123—119(E) |
| 1,901,709 | 3/1933 | Erren | 123—39 |
| 1,905,627 | 4/1933 | Holland | 123—119X |
| 2,183,674 | 12/1939 | Erren | 123—27(GAS) |
| 2,365,330 | 12/1944 | Carmichael | 123—3X |
| 2,376,479 | 5/1945 | Fehling | 123—1 |
| 2,431,857 | 12/1947 | Fenney | 123—32(G) |
| 2,602,289 | 7/1952 | Anxionnaz et al. | 123—27(GAS)UX |
| 2,937,634 | 5/1960 | Kelseaux et al. | 123—119(E) |
| 3,471,274 | 10/1969 | Quigley, Jr. et al. | 123—1X |

AL LAWRENCE SMITH, Primary Examiner

U.S. Cl. X.R.

123—27, 39, 119